United States Patent
Larson et al.

(10) Patent No.: US 8,300,352 B1
(45) Date of Patent: Oct. 30, 2012

(54) DISK DRIVE HAVING MOUNTING INSERTS WITH CANTILEVERED BEAMS

(75) Inventors: Nils E. Larson, San Jose, CA (US); John R. Edwards, Mountain View, CA (US); David K. Myers, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 804 days.

(21) Appl. No.: 12/487,502

(22) Filed: Jun. 18, 2009

(51) Int. Cl.
*G11B 33/14* (2006.01)
(52) U.S. Cl. .................................... 360/97.01
(58) Field of Classification Search ............. 360/97.01
See application file for complete search history.

(56) References Cited

U.S. PATENT DOCUMENTS

| | | |
|---|---|---|
| 4,713,714 A | 12/1987 | Gatti et al. |
| 4,831,476 A | 5/1989 | Branc et al. |
| 5,004,207 A | 4/1991 | Ishikawa et al. |
| 5,041,924 A | 8/1991 | Blackborow et al. |
| 5,124,855 A | 6/1992 | Dew et al. |
| 5,216,582 A | 6/1993 | Russell et al. |
| 5,223,996 A | 6/1993 | Read et al. |
| 5,349,486 A | 9/1994 | Sugimoto et al. |
| 5,463,527 A | 10/1995 | Hager et al. |
| 5,535,092 A | 7/1996 | Bang |
| 5,654,875 A | 8/1997 | Lawson |
| 5,694,267 A | 12/1997 | Morehouse et al. |
| 5,777,821 A | 7/1998 | Pottebaum |
| 6,125,097 A | 9/2000 | Wu |
| 6,130,817 A | 10/2000 | Flotho et al. |
| 6,166,901 A | 12/2000 | Gamble et al. |
| 6,249,432 B1 | 6/2001 | Gamble et al. |
| 6,275,352 B1 | 8/2001 | Tadepalli et al. |
| 6,285,545 B1 | 9/2001 | Lopez |
| 6,292,359 B1 * | 9/2001 | Boe .................... 361/679.58 |
| 6,487,039 B1 | 11/2002 | Bernett |
| 6,496,362 B2 | 12/2002 | Osterhout et al. |
| 6,498,722 B1 | 12/2002 | Stolz et al. |
| 6,545,865 B2 | 4/2003 | Albrecht et al. |
| 6,567,265 B1 | 5/2003 | Yamamura et al. |
| 6,618,246 B2 | 9/2003 | Sullivan et al. |
| 6,714,405 B2 | 3/2004 | Jitsukawa |
| 6,751,092 B1 | 6/2004 | Ohnishi et al. |
| 6,873,524 B2 | 3/2005 | Kaczeus, Sr. et al. |
| D512,422 S | 12/2005 | Sato et al. |
| 7,106,582 B2 | 9/2006 | Albrecht et al. |

(Continued)

OTHER PUBLICATIONS

Shawn Casey, "Hard Drive Mounting in Notebook Computer Systems", 2579-771615-A00-P2, Feb. 2011, 29 pages, Western Digital White Paper available at www.wdc.com.

*Primary Examiner* — Mark Blouin

(57) ABSTRACT

A novel disk drive includes a disk drive base that includes a plurality of mounting recessions. Each of a plurality of mounting inserts at least partially protrudes into a respective one of the plurality of mounting recessions, and contacts the disk drive base. Each of the plurality of mounting inserts includes a body portion that is adapted to be attached to a host computer system. Each of the plurality of mounting inserts also includes at least one cantilevered beam having a root end that is attached to the body portion and having a distal end that is in contact with the disk drive base in a respective one of the plurality of mounting recessions. The root end is not in contact with the disk drive base when the mounting insert is in an undeformed state.

16 Claims, 4 Drawing Sheets

U.S. PATENT DOCUMENTS

| | | |
|---|---|---|
| 7,106,583 B2 | 9/2006 | Koh et al. |
| 7,215,506 B2 | 5/2007 | Albrecht et al. |
| 7,227,761 B2 | 6/2007 | Estes et al. |
| 7,312,982 B2 | 12/2007 | Bruner et al. |
| 7,471,509 B1 | 12/2008 | Oliver |
| 2005/0088778 A1 | 4/2005 | Chen et al. |
| 2005/0180045 A1 | 8/2005 | Tsuda et al. |
| 2005/0185326 A1 | 8/2005 | Bruner et al. |
| 2005/0275966 A1 | 12/2005 | Janik et al. |
| 2006/0002076 A1 | 1/2006 | Albrecht et al. |
| 2006/0158775 A1 | 7/2006 | Sega et al. |
| 2010/0290154 A1* | 11/2010 | Kim et al. .................. 360/97.02 |

* cited by examiner

DISK DRIVE HAVING MOUNTING INSERTS WITH CANTILEVERED BEAMS

BACKGROUND OF THE INVENTION

1. Field of the Invention

The present invention relates generally to the field of information storage devices, and more particularly to mounting systems and housings for disk drives.

2. Background of the Art

Disk drives are used to retrieve and/or store data for computer systems and other consumer electronics products. Examples of disk drives include magnetic hard disk drives, optical disk drives, magneto-optical disk drives, and removable-media disk drives. Many disk drives include internal components that are sensitive to environmental contamination, and mechanical shocks and vibrations from outside the disk drive. For example, the surfaces of magnetic hard disks on which information is stored may be damaged by collisions with other internal components (e.g. read/write heads and/or supporting arms and/or loading ramps). Such internal components are typically enclosed within a disk drive housing. For example, FIG. 1 depicts a disk drive 100 with a disk drive housing that includes a disk drive base 110 and a cover 120. The disk drive housing encloses a spindle 130, which is attached to and rotates at least one magnetic hard disk. The magnetic hard disk is not shown in FIG. 1 because it is internal to the disk drive housing. The characteristics of the disk drive housing (and the mounts that hold it) may help reduce the adverse effects of mechanical shocks and vibrations from outside the disk drive.

For example, so-called "internal" disk drives are mounted within a host computer system or consumer electronics device for which the disk drive stores data. Mechanical shocks or vibrations may be transmitted to the disk drive via its mounts from such a host computer system or consumer electronics device. So-called "external disk drives" are not mounted within the system for which they retrieve and/or store data, but rather are mounted within a separate external enclosure. In that case also, mechanical shocks or environmental vibrations may be transmitted to the disk drive housing via its mounts. Thus there is a need in the art for a disk drive housing and/or mounting system that helps reduce the effect of mechanical shocks and vibrations from outside the disk drive.

Alternatively or additionally, the transmission of vibration in the opposite direction may be of design concern. Specifically, vibration and acoustic disturbances caused by the operation of the disk drive itself may be undesirable if transmitted to a corresponding host computer system and/or consumer electronics device. For this reason too, vibration and acoustic transmission via disk drive housing mounts is an important consideration in the design of disk drive housings (base and cover) and corresponding mounting and fastening systems. Accordingly, there is also a need in the art for a disk drive housing and/or mounting system that can help reduce the effect of vibration and acoustic disturbances from within the disk drive.

The designer of the housing and/or mounts for a disk drive faces a challenge that is compounded by several requirements and constraints. For example, the mounting systems and housings for modern disk drives must meet very tight cost requirements, and typically must also meet dimensional limitations imposed by industry-standard "form factor" requirements. Such cost and dimensional constraints create a design tendency towards simple and relatively stiff mounting solutions that may unintentionally exacerbate the transmission of mechanical shocks, vibration, and acoustic disturbances. For example, the disk drive 100 (shown in FIG. 1) is adapted to be stiffly mounted to a host computer system by threaded fasteners that extend from the host computer system and screw into threaded holes 102 and/or 104 in the disk drive base 110.

Furthermore, disk drives typically include a printed circuit board (PCB)—not shown in FIG. 1—that is electrically connected to the host system's "mother board" (or another PCB of the host system or consumer electronics device). However, such electrical connection typically also entails an additional mechanical connection that can provide an additional path for transmission of mechanical shock, vibration, and acoustic disturbances. This, in turn, may unacceptably reduce the effectiveness of conventional mechanical shock, vibration, and/or acoustic isolation methods and/or components.

Accordingly, there is an ongoing need in the art for improved housings and mounting systems for disk drives.

SUMMARY

A novel disk drive for use with a host computer system is disclosed and claimed. The disk drive includes a disk drive base that includes a plurality of mounting recessions. The disk drive also includes a spindle defining an axis of rotation, and being rotably attached to the disk drive base. A mounting insert (of a plurality of mounting inserts) at least partially protrudes into each of the plurality of mounting recessions, with each of the mounting inserts contacting the disk drive base. Each of the plurality of mounting inserts includes a body portion that is adapted to be attached to the host computer system. Each of the plurality of mounting inserts also includes at least one cantilevered beam having a root end that is attached to the body portion and having a distal end that is in contact with the disk drive base in a respective one of the plurality of mounting recessions. The root end is not in contact with the disk drive base when the mounting insert is in an undeformed state.

DETAILED DESCRIPTION OF EXEMPLARY EMBODIMENTS

Figure 1:
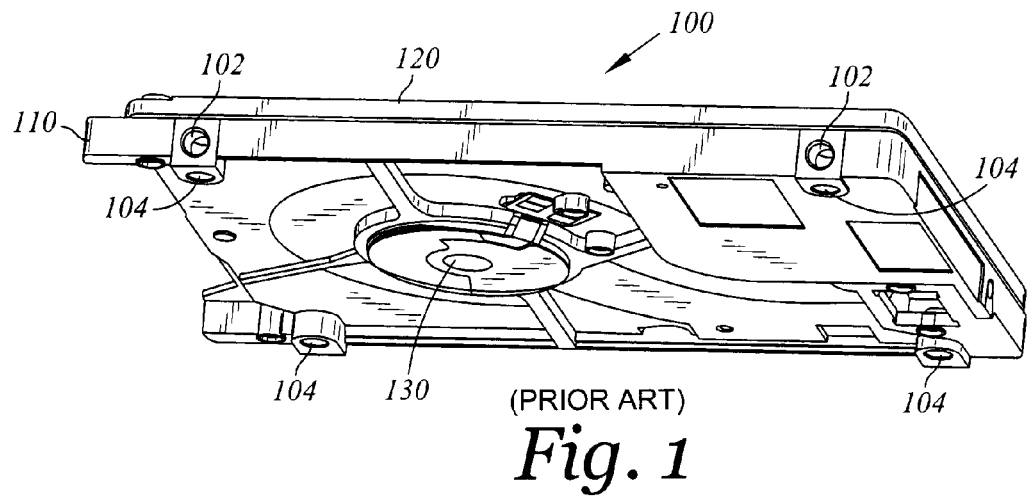
FIG. 1 depicts an underside perspective view of a conventional disk drive.
Figure 2:
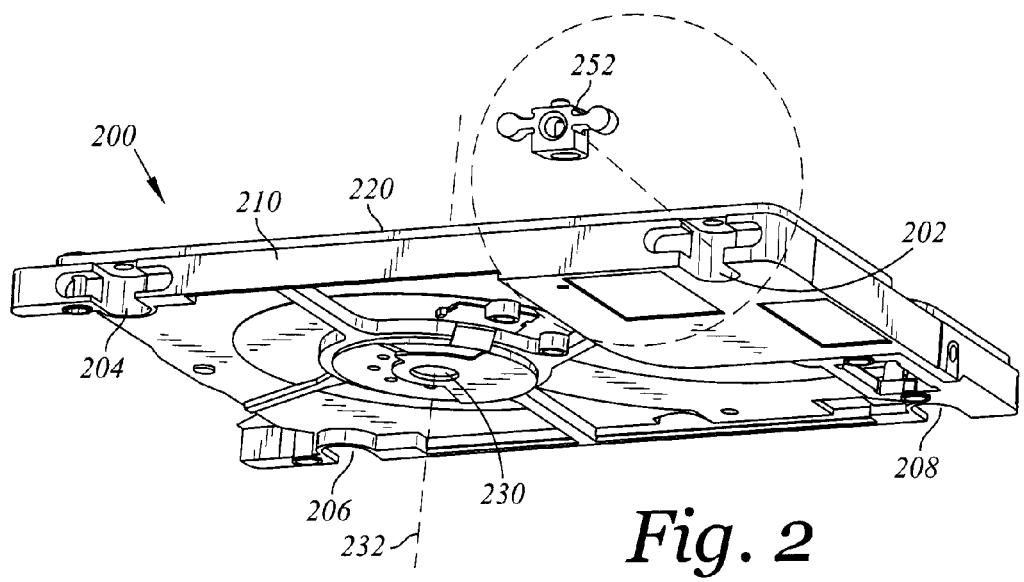
FIG. 2 depicts an exploded underside perspective view of a disk drive according to an embodiment of the present invention.

FIG. 2 depicts an exploded underside perspective view of a disk drive 200 for use with a host computer system, according to an embodiment of the present invention. Disk drive 200 includes a disk drive base 210 that includes a plurality of mounting recessions 202, 204, 206, and 208. The disk drive 200 also includes a spindle 230 defining an axis of rotation 232, and being rotably attached to the disk drive base 210. The spindle 230 supports and controls the rotation of an attached disk about the spindle axis of rotation 232, the disk serving as a storage media for information stored and/or accessed by the disk drive 200. The disk is not shown in FIG. 2 because it is enclosed within the disk drive housing that is formed by the disk drive base 210 and the cover 220. Similarly, only the bottom face of the spindle shaft of spindle 230 is visible in FIG. 2, having been press-fit into a hole in the disk drive base 210 from the other side (or otherwise conventionally attached to the disk drive base 210), with the rest (or all) of the spindle 230 being enclosed within the disk drive housing.

Figure 3:
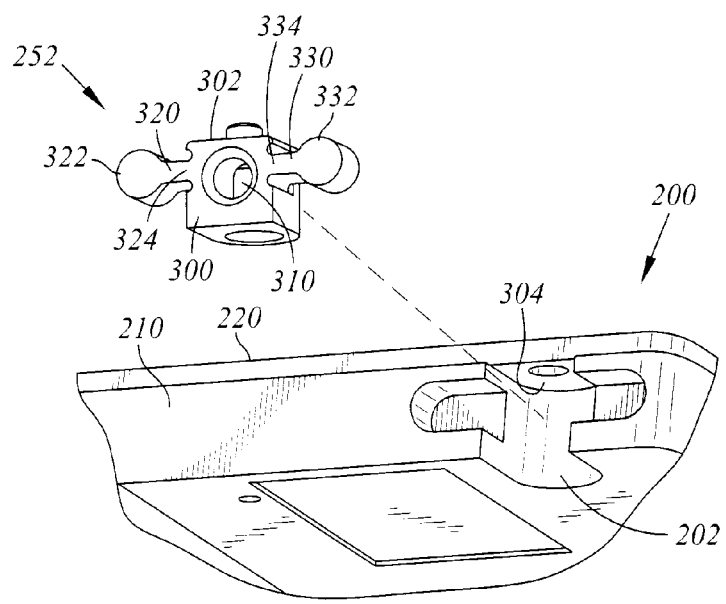
FIG. 3 is a close-up view of a mounting insert and mounting recession of the disk drive of FIG. 2.

A mounting insert 252 at least partially protrudes into the mounting recession 202, and contacts the disk drive base 210. FIG. 3 is a close-up exploded view of the mounting insert 252 and mounting recession 202 of the disk drive 200. The mounting insert 252 includes a body portion 300 that is adapted to be attached to the host computer system (e.g. by receiving a threaded fastener, a snap-in feature, or a rivet, etc, extending from the host computer system into hole 310). In the embodiment of FIG. 3, the mounting insert 252 also includes two cantilevered beams 320 and 330. Cantilevered beam 320 has a root end 324 that is attached to the body portion 300, and has a distal end 322 that is in contact with the disk drive base 210 in the mounting recession 202. Likewise, cantilevered beam 330 has a root end 334 that is attached to the body portion 300, and has a distal end 332 that is in contact with the disk drive base 210 in the mounting recession 202.

The mounting insert 252 is depicted in an undeformed state in FIG. 3, and its root ends 324 and 334 are not in contact with the disk drive base 210. Rather, the distal ends 322 and 332 are thicker than the rest of the cantilevered beams 320 and 330, so that the distal ends 322 and 332 contact the disk drive base 210, while the rest of the cantilevered beams 320 and 330 do not. Specifically, the distal ends 322 and 332 are rounded, and have a diameter that is greater than a thickness of each cantilevered beam 320 and 330 at a locations closer to the root ends 324 and 334, respectively. Consequently, in the embodiment of FIG. 3, the root ends 324 and 334 are separated from the disk drive base 210 by a limited travel clearance so that they will not contact with the disk drive base 210 even as limited travel of the body portion 300 causes the cantilevered beams 320 and 330 to deform and change their angular orientation somewhat. For example, the limited travel clearance between the root end 324 and the disk drive base 210, measured in a direction parallel to the spindle axis of rotation 232, is preferably in the range 0.25 mm to 1.25 mm. A limited travel clearance in this range may advantageously reduce the transmission and/or adverse effects of mechanical shocks and vibrations.

Alternatively, the travel of the body portion 300 relative to the disk drive base 210 may be limited in a direction parallel to the spindle axis of rotation 232 by contact between a limiting surface 302 and a stopping surface 304 of the disk drive base 210 (within the mounting recession 202), when the mounting insert 252 is in a sufficiently deformed state. In this case, the limiting surface 302 of the body portion 300 is preferably separated from the stopping surface 304 of the disk drive base 210 (within the mounting recession 202) by a limited travel clearance in the range 0.25 mm to 1.25 mm, when the cantilevered beams 320 and 330 are in an undeformed state. A limited travel clearance in this range may advantageously reduce the transmission and/or adverse effects of mechanical shocks and vibrations. For example, in certain preferred embodiments the limiting surface 302 of the body portion 300 will contact the stopping surface 304 of the disk drive base 210 (within the mounting recession 202) if a deformation of the mounting insert 252, measured at the body portion 300, in a direction parallel to the spindle axis of rotation 232, exceeds a travel limit of 0.75 mm.

Figure 4:
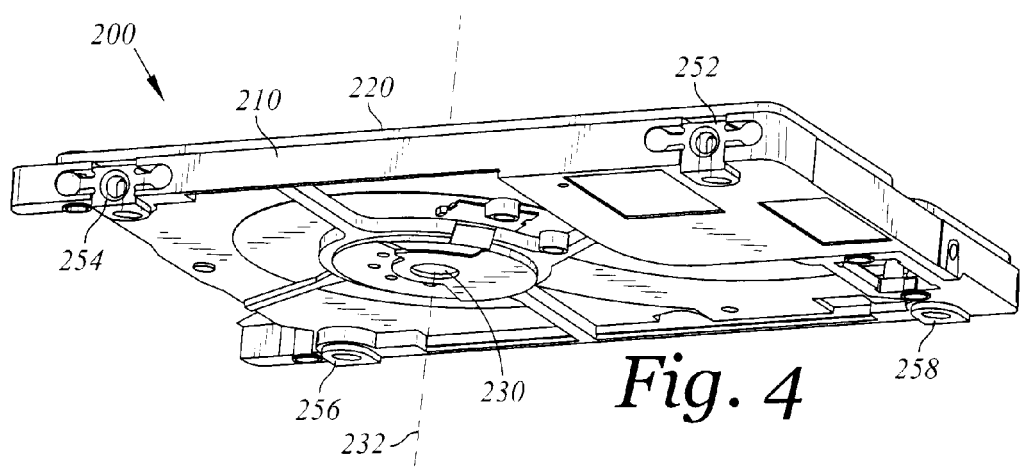
FIG. 4 depicts an underside perspective view of the disk drive of FIG. 2.

FIG. 4 depicts an underside perspective view of the disk drive 200, with a plurality of mounting inserts 252, 254, 256, and 258 installed and protruding into each of the plurality of mounting recessions 202, 204, 206, and 208, respectively. In the embodiment of FIG. 4, the body portion and the cantilevered beams of each of the plurality of mounting inserts 252, 254, 256, and 258 preferably comprise a plastic material such as polycarbonate plastic, polyoxymethylene plastic, or polyetherimide plastic.

If the disk drive 200 is a 65 mm form factor disk drive (i.e. the so-called "2.5 inch form factor"), a total spring rate for travel of the plurality of mounting recessions 202, 204, 206, and 208, of the disk drive base 210 relative to the body portions of the plurality of mounting inserts 252, 254, 256, and 258, in a direction parallel to the spindle axis of rotation 232, is preferably in the range 200 KN/m to 600 KN/m. A total spring rate in this range may advantageously reduce the transmission and/or adverse effects of mechanical shocks and vibrations for a 65 mm form factor disk drive. Since in the embodiment of FIG. 4 the plurality of mounting inserts optionally consists of four mounting inserts 252, 254, 256, and 258, a spring rate for relative motion of one of the plurality of mounting recessions 202, 204, 206, and 208 relative to the body portion of a respective one of the four mounting inserts 252, 254, 256, and 258, in a direction parallel to the spindle axis of rotation 232, would preferably be in the range 50 KN/m to 150 KN/m.

On the other hand, if the disk drive 200 of FIG. 4 is a 95 mm form factor disk drive (i.e. the so-called "3.5 inch form factor"), a total spring rate for travel of the plurality of mounting recessions 202, 204, 206, and 208, of the disk drive base 210 relative to the body portions of the plurality of mounting inserts 252, 254, 256, and 258, in a direction parallel to the spindle axis of rotation 232, is preferably in the range 2000 KN/m to 6000 KN/m. In certain preferred embodiments, the total spring rate is substantially constant until the travel of the body portions meets its travel limit, whereas in certain alternative embodiments the total spring rate increases as the travel increases. A total spring rate in the aforementioned range may advantageously reduce the transmission and/or adverse effects of mechanical shocks and vibrations for a 95 mm form factor disk drive. Since in the embodiment of FIG. 4 the plurality of mounting inserts optionally consists of four mounting inserts 252, 254, 256, and 258, a spring rate for relative motion of one of the plurality of mounting recessions 202, 204, 206, and 208 relative to the body portion of a respective one of the four mounting inserts 252, 254, 256, and 258, in a direction parallel to the spindle axis of rotation 232, would preferably be in the range 500 KN/m to 1500 KN/m.

Figure 5:
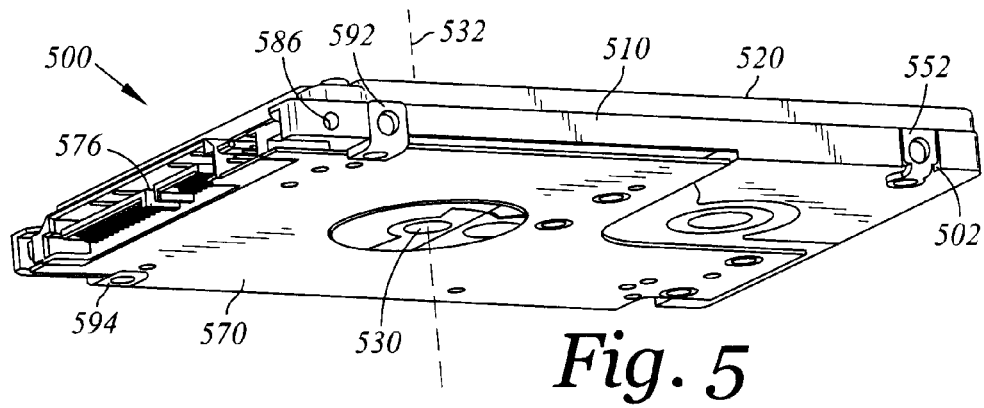
FIG. 5 depicts an exploded underside perspective view of a disk drive according to another embodiment of the present invention.

FIG. 5 depicts an underside perspective view of a disk drive 500 for use with a host computer system, according to another embodiment of the present invention. Disk drive 500 includes a disk drive base 510 that includes a plurality of mounting recessions (e.g. mounting recession 502). The disk drive 500 also includes a spindle 530 defining an axis of rotation 532, and being rotably attached to the disk drive base 510. The spindle 530 supports and controls the rotation of an attached disk about the spindle axis of rotation 532, the disk serving as a storage media for information stored and/or accessed by the disk drive 500. The disk is not shown in FIG. 5 because it is enclosed within the disk drive housing that is formed by the disk drive base 510 and the cover 520. Similarly, only the bottom face of the spindle shaft of spindle 530 is visible in FIG. 5, having been press-fit into a hole in the disk drive base 510 from the other side (or otherwise conventionally attached to the disk drive base 510), with the rest (or all) of the spindle 530 being enclosed within the disk drive housing.

Figure 6:
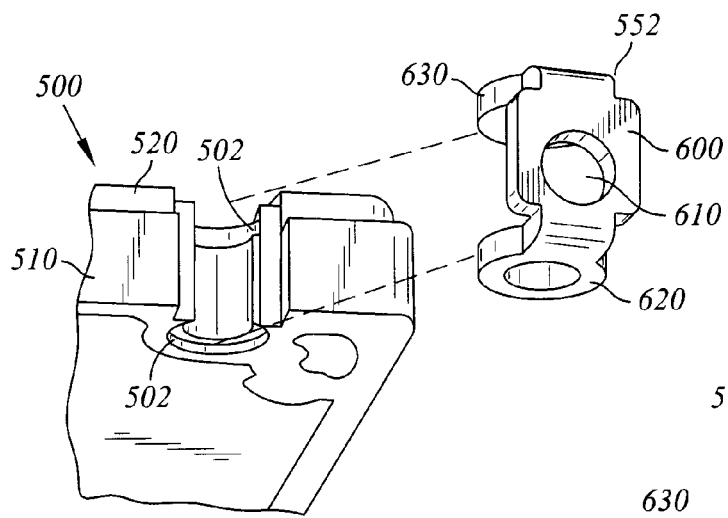
FIG. 6 is a close-up exploded view of a mounting insert and mounting recession of the disk drive of FIG. 5.
Figure 7:
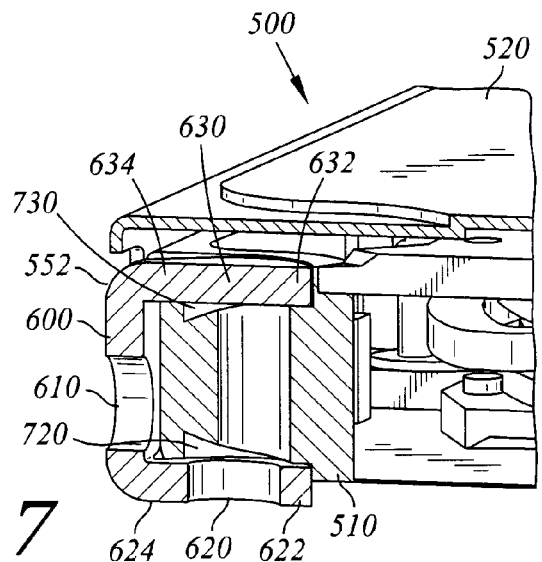
FIG. 7 is a close-up cross-sectional view of a mounting insert and mounting recession of the disk drive of FIG. 5.

FIG. 6 is a close-up exploded view of a mounting insert 552 and the mounting recession 502 of the disk drive 500, and FIG. 7 is a close-up cross-sectional view of the mounting insert 552 in the mounting recession 502. Now referring additionally to the embodiment of FIGS. 6 and 7, the mounting insert 552 at least partially protrudes into the mounting recession 502, and contacts the disk drive base 510. The mounting insert 552 includes a body portion 600 that is adapted to be attached to the host computer system (e.g. by receiving a threaded fastener, a snap-in feature, or a rivet, etc, extending from the host computer system into hole 610). In the embodiment of FIGS. 5-7, the mounting insert 552 also includes two cantilevered beams 620 and 630. Cantilevered beam 620 has a root end 624 that is attached to the body portion 600, and has a distal end 622 that is in contact with the disk drive base 510 in the mounting recession 502. Likewise, cantilevered beam 630 has a root end 634 that is attached to the body portion 600, and has a distal end 632 that is in contact with the disk drive base 510 in the mounting recession 502.

The mounting insert 552 is depicted in an undeformed state in FIGS. 6 and 7, and its root ends 624 and 634 are not in contact with the disk drive base 510. Rather, in the embodiment of FIGS. 6 and 7, the mounting recession 502 of the disk drive base 510 is tapered so that the distal ends 622 and 632 contact the disk drive base 510, while the rest of the cantilevered beams 620 and 630 do not. Specifically, the root ends 624 and 634 of the cantilevered beams 620 and 630 will not contact the disk drive base 510 until one of the tapered limited travel clearances 720 or 730 has been exceeded. In this regard, the cantilever beam 620 overlies a surface of the mounting recession 502 that is canted to not be normal to the spindle axis of rotation 532 and that defines the limited travel clearance 720. Likewise, the cantilever beam 630 overlies a surface of the mounting recession 502 that is canted to not be normal to the spindle axis of rotation 532 and that defines the limited travel clearance 730.

Consequently, in the embodiment of FIGS. 5-7, the root ends 624 and 634 are separated from the disk drive base 510 by the limited travel clearances 720 and 730, respectively, so that they will not contact with the disk drive base 510 even as limited travel of the body portion 600 causes the cantilevered beams 620 and 630 to deform and change their angular orientation somewhat. For example, the limited travel clearances 720, 730 between the root ends 624, 634 and the disk drive base 510, measured in a direction parallel to the spindle axis of rotation 532, are preferably in the range 0.25 mm to 1.25 mm. A limited travel clearance in this range may advantageously reduce the transmission and/or adverse effects of mechanical shocks and vibrations. In the embodiment of FIGS. 5-7, the body portion 600 and the cantilevered beams 620 and 630 of the mounting insert 552 preferably comprise a metal material such as an alloy of steel, an alloy of aluminum, an alloy of copper, and/or an alloy of beryllium. Alloys of steel include low carbon steel, stainless steel, spring steel, etc.

Figure 8:
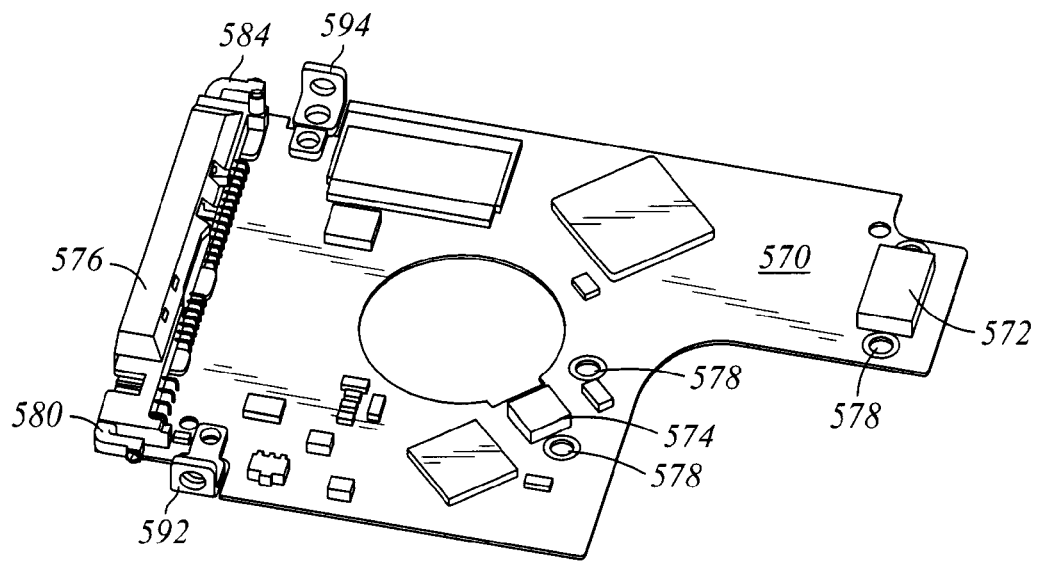
FIG. 8 depicts a printed circuit board (PCB) of the disk drive of FIG. 5.

The disk drive 500 of FIG. 5 further includes a printed circuit board (PCB) 570, that is also shown (pre-assembly) as a separate component in the perspective view of FIG. 8. A portion of the PCB 570 is also shown in the close-up perspective view of FIG. 9. The disk drive PCB 570 may be distinguished from other PCBs (e.g. PCBs of a host computer system such as the so-called "mother board," or PCBs of a consumer electronics device) in that the disk drive PCB 570 includes conventional electronics that controls internal components of the disk drive 500, such as the spindle 530. The disk drive PCB 570 also includes conventional electronics that sends and receives signals (e.g. via a conventional pre-amplifier) to and from read/write heads in the disk drive 500.

Figure 9:
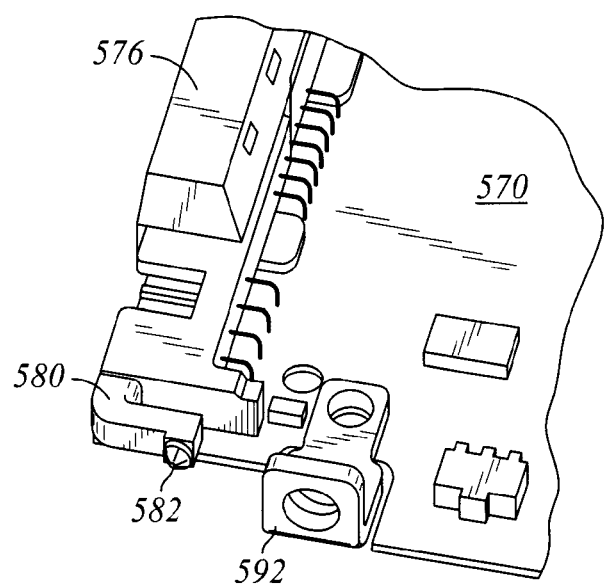
FIG. 9 is a close-up view of a portion of the PCB of FIG. 8.

Now referring to the embodiment of FIGS. 5, 8 and 9, the PCB 570 is attached to the disk drive base 510 by a plurality of fasteners (e.g. screws) that extend through holes 578. The fasteners 578 are located near or adjacent disk drive electrical connectors 572 and 574 that electrically connect the PCB 570 to various internal components of the disk drive 500 (e.g. via sealed conduits through the disk drive base 510). The PCB 570 also includes brackets 592 and 594 that are adapted to be attached to the host computer system (e.g. via holes in the brackets 592 and 594). Note that the brackets 592 and 594 are located close or adjacent host electrical connector 576 that is adapted to be electrically connected to the host computer system or computer electronics device (e.g. plugged into a mother board of the host computer system). Thus, brackets 592 and 594 serve to hold the host electrical connector 576 in a fixed position relative to the host, while holes 578 accommodate fasteners that hold the disk drive electrical connectors 572 and 574 in a fixed position relative to the disk drive base 510.

Note that in the embodiment of FIGS. 5, 8, and 9, none of the plurality of fasteners that pass through holes 578 are disposed nearer to the host connector 576 than to the disk drive electrical connectors 572 and 574. Also, the PCB's major circuit board surface (that faces the disk drive base) is preferably separated from the disk drive base by a gap in the range 0.25 to 1.25 mm. This combination of geometric constraints may advantageously enable the PCB to function somewhat like a leaf spring to enhance compliance and potentially advantageously reduce the transmission and/or adverse effects of mechanical shocks and vibrations.

Since the brackets 592 and 594 in the region of the PCB 570 that includes the host connector 576 are attached only to the host computer system or consumer electronics device, but are not attached to the disk drive base 510, an additional but compliant attachment means may be helpful to retain the PCB 570 sufficiently with the disk drive 500 prior to mounting of the disk drive 500 in the host computer system or consumer electronics device. For example, in the embodiment of FIGS. 5, 8, and 9, the host connector 576 of the PCB 570 includes two compliant fingers 580 and 584 that protrude from the host connector 576 and engage with the disk drive base 510. Specifically, as shown in FIG. 9, compliant finger 580 includes a rounded distal pin 582 that engages in a corresponding hole 586 in the disk drive base 510. The compliant fingers 580 and 584 are preferably not stiff enough that they would interfere with the aforementioned desired leaf spring function of the PCB 570 (after the disk drive 500 is mounted in the host computer system or consumer electronics device), while being stiff enough to sufficiently keep the PCB 570 together with the disk drive base 510 (before mounting). Such desired compliance may be achieved in either bending or in torsion, depending on the design of the compliant fingers 580 and 584.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A disk drive for use with a host computer system, the disk drive comprising:
   a disk drive base that includes a plurality of mounting recessions;
   a spindle defining an axis of rotation and being rotably attached to the disk drive base; and
   a plurality of mounting inserts, each at least partially protruding into a respective one of the plurality of mounting recessions and contacting the disk drive base;
   wherein each of the plurality of mounting inserts includes
      a body portion that is adapted to be attached to the host computer system, and
      at least one cantilevered beam having a root end that is attached to the body portion and having a distal end that is in contact with the disk drive base in a respective one of the plurality of mounting recessions, and
   wherein the root end is not in contact with the disk drive base when the mounting insert is in an undeformed state.

2. The disk drive of claim 1 wherein the body portion includes a hole for receiving a threaded fastener.

3. The disk drive of claim 1 wherein the root end is separated from the disk drive base by a limited travel clearance when the at least one cantilevered beam is in the undeformed state.

4. The disk drive of claim 3 wherein the limited travel clearance, measured in a direction parallel to the spindle axis of rotation, is in the range 0.25 mm to 1.25 mm.

5. The disk drive of claim 1 wherein the disk drive is a 65 mm form factor disk drive and wherein a total spring rate for travel of the plurality of mounting recessions of the disk drive base relative to the body portions of the plurality of mounting inserts, in a direction parallel to the spindle axis of rotation, is in the range 200 KN/m to 600 KN/m.

6. The disk drive of claim 1 wherein the disk drive is a 95 mm form factor disk drive and wherein a total spring rate for travel of the plurality of mounting recessions of the disk drive base relative to the body portions of the plurality of mounting inserts, in a direction parallel to the spindle axis of rotation, is in the range 2000 KN/m to 6000 KN/m.

7. The disk drive of claim 6 wherein the total spring rate is substantially constant until the travel meets a travel limit.

8. The disk drive of claim 6 wherein the total spring rate increases as the travel increases.

9. The disk drive of claim 1 wherein the body portion and the at least one cantilevered beam comprise a material selected from the group consisting of polycarbonate plastic, polyoxymethylene plastic, and polyetherimide plastic.

10. The disk drive of claim 1 wherein the body portion and the at least one cantilevered beam comprise a material selected from the group consisting of alloys of steel, alloys of aluminum, alloys of copper, and alloys of beryllium.

11. The disk drive of claim 1 wherein the body portion includes a limiting surface that is separated from the disk drive base by a limited travel clearance when the at least one cantilevered beam is in the undeformed state, the limiting surface contacting the disk drive base when the at least one cantilevered beam is in a deformed state.

12. The disk drive of claim 1 wherein the distal end is thicker than the root end.

13. The disk drive of claim 1 wherein the distal end is rounded and has a diameter that is greater than a thickness of the at least one cantilevered beam at a location that is closer to the root end.

14. The disk drive of claim 1 wherein the at least one cantilever beam overlies a surface of the respective one of the plurality of mounting recessions that is not normal to the spindle axis of rotation.

15. The disk drive of claim 1 further comprising a printed circuit board (PCB) attached to the disk drive base; and wherein the PCB includes a host connector and a head-disk assembly (HDA) connector, the host connector being attachable to the host computer system, the PCB being attached to the disk drive base by a plurality of fasteners, none of the plurality of fasteners being disposed nearer to the host connector than to the HDA connector, and wherein the PCB defines a major circuit board surface that faces the disk drive base but is separated from the disk drive base by a gap in the range 0.25 to 1.25 mm.

16. The disk drive of claim 15 wherein the PCB includes at least one compliant finger that protrudes from the host connector and engages with the disk drive base.

* * * * *